US005384713A

United States Patent [19]

Kleinfelder

[11] Patent Number: 5,384,713

[45] Date of Patent: Jan. 24, 1995

[54] APPARATUS AND METHOD FOR ACQUIRING AND DETECTING STALE DATA

[76] Inventor: Stuart A. Kleinfelder, 19 Drury La., Berkeley, Calif. 94705

[21] Appl. No.: 781,765

[22] Filed: Oct. 23, 1991

[51] Int. Cl.⁶ .......... G06F 15/20

[52] U.S. Cl. .......... 364/550; 324/113

[58] Field of Search .......... 324/113; 364/550

[56] References Cited

U.S. PATENT DOCUMENTS

| | | | |
|---|---|---|---|
| Re. 31,668 | 9/1984 | Marsh et al. | 324/113 |
| 3,855,456 | 12/1974 | Summers et al. | 364/492 |
| 3,927,308 | 12/1975 | Summers et al. | 364/511 |
| 4,090,191 | 5/1978 | Kinbara | 328/51 X |
| 4,129,830 | 12/1978 | Kinbara | 324/181 X |
| 4,168,541 | 9/1979 | DeKarske | 364/DIG. 1 X |
| 4,186,298 | 1/1980 | Kinbara | 328/129 X |
| 4,322,795 | 3/1982 | Lange et al. | 364/DIG. 1 |
| 4,400,783 | 8/1983 | Locke, Jr. et al. | 324/113 X |
| 4,500,786 | 2/1985 | Britten et al. | 250/389 |
| 4,504,438 | 3/1985 | Levy et al. | 376/156 |
| 4,677,295 | 6/1987 | Negra et al. | 250/287 |
| 4,719,608 | 1/1988 | Genat et al. | 368/113 |
| 4,724,421 | 2/1988 | Simison et al. | 377/20 X |
| 4,747,043 | 5/1988 | Rodman | 364/DIG. 1 |
| 4,818,862 | 4/1989 | Conzemius | 250/287 |
| 4,879,687 | 11/1989 | Okamoto et al. | 365/200 |
| 5,007,431 | 4/1991 | Donehoo, III | 364/413.06 X |
| 5,185,700 | 2/1993 | Bezos et al. | 364/424.04 |

OTHER PUBLICATIONS

"MTD132-A New Sub-Nansecond Multi-Hit CMOS Time-to-Digital Converter," Kleinfelder et al., IEEE Transactions on Nuclear Science, vol. 38, No. 2, Apr. 1991, pp. 97-101.

1990 Research Instrumentation Catalog, LeCroy Corporation, pp. 63-66, 81-86, 115-134.

*Primary Examiner*—Edward R. Cosimano
*Attorney, Agent, or Firm*—Curtis, Morris & Safford

[57] ABSTRACT

Stale data is detected in a shift register containing time characters representing event occurrence times, expressed in timing data counts of a cyclic counter, by comparing the most significant bit of each stored time character with a value based on the most significant bits of a current timing data count. A stale stored time character is disposed of by setting its associated validity flag, which indicates that the time character is not to be read out of the shift register.

21 Claims, 6 Drawing Sheets

| CURRENT TIMING COUNT | | | PERIODIC DISPOSAL SIGNAL | | STORED TIME CHARACTER | | FLAG RESET SIGNAL |
|---|---|---|---|---|---|---|---|
| BIT | BITn+2 | BITn+2 | A1 | A2 | n+2 | NOT(n+2) | |
| | | | FIRST CYCLE | | | | |
| 0 | 0 | 0 | 0 | 0 | – | – | 1 |
| 1 | 0 | 0 | 0 | 0 | – | – | 1 |
| | | | SECOND CYCLE | | | | |
| 1 | 1 | 0 | 1 | 0 | 1 | 0 | 0 |
| | | | | | 0 | 1 | 1 |
| 0 | 1 | 0 | 0 | 0 | – | – | 1 |
| | | | THIRD CYCLE | | | | |
| 0 | 1 | 1 | 0 | 0 | – | – | 1 |
| 1 | 1 | 1 | 0 | 0 | – | – | 1 |
| | | | FOURTH CYCLE | | | | |
| 1 | 0 | 1 | 0 | 1 | 1 | 0 | 1 |
| | | | | | 0 | 1 | 0 |
| 0 | 0 | 1 | 0 | 0 | – | – | 1 |

FIG. 5

APPARATUS AND METHOD FOR ACQUIRING AND DETECTING STALE DATA

BACKGROUND OF THE INVENTION

This invention relates to acquiring data, and, more particularly, to an apparatus and method for acquiring data in a shift register that is used to store data representing occurrence times of events and for detecting when that data has become stale.

A time-to-digital converter (TDC) is used to capture the time at which an event occurs, that is, to convert an occurrence time into digital timing data. A typical application is in particle physics experimentation in which a system of detectors is instrumented so as to produce detection signals supplied to individual channels of the TDC in response to the occurrence of events, such as sub-atomic particles colliding with nuclei. Unfortunately, in addition to desired experimental data signals, unwanted signals are generated from real events not of interest and from background events such as neutron interactions and cosmic rays. Events not of interest often occur well before or after events of interest, so that if an event is captured well before an event of interest, data related thereto generally is stale by the time the event of interest occurs.

Event capture is done by setting a TDC to operate in either "common start" or "common stop" mode. In common start mode, a common start signal is supplied to start a time counter used with all channels, which is stopped, that is, the time count is captured, when an event, or hit, arrives at the channel. In common stop mode, the time counter is started in each channel by the arrival of a hit, and time count capture is effected upon the arrival of a common stop signal supplied simultaneously to all channels. Common stop mode is preferred when large numbers of detectors are used, as is usual in modern experiments, because less cabling and less inter-channel signal synchronization are required than when common start mode is used.

In older TDCs, the time counter is a charging capacitor, where time is determined from charge level. However, such an analog time counter introduces linearity difficulties, that is, distortion in the time. In newer TDCs, a crystal controlled digital time counter is used, but this counter presents difficulties in timing resolution, that is, the duration in nanoseconds ($10^{-9}$ seconds) of a timing count, and in dynamic range, that is, the largest number of timing counts that can be distinguished.

Conventional single hit TDCs are provided with a limited capacity to capture one event per channel. However, these TDCs permit a desired event to be hidden by stale data.

Newer TDCs have multi-hit channels, that is, channels which have a higher storage capacity sufficient to capture many events per channel. Two techniques generally are used in digital multi-hit TDCs: clocking of a shift register and writing the value of a counter to memory.

An example of a multi-hit shift register TDC is the LeCroy Model 1879 Pipeline TDC described at page 63 of the 1990 Research Instrumentation Catalog of the LeCroy Corporation, the assignee of the present invention. The Model 1879 TDC includes a 512 element shift register whose contents are shifted at every clock pulse. The absence of a hit in a channel during a clock pulse is indicated by one value, such a logical "0" and the presence of a hit is indicated by another value, such as logical "1". Each of the 512 values is read out for subsequent data analysis. Drawbacks of this approach are that the dynamic range is limited to 512 clock pulses, and that, since the TDC is unavailable for data capture during read out, the period of unavailability is extended by read out of values indicating absence of events.

Multi-hit TDCs in which a time count is Written to a memory are limited to common start applications due to counter roll-over. That is, common stop mode cannot be used when writing time counts to memory because of the inability to distinguish stale data in memory.

Conventional techniques for identifying stale data are known in the computer cache memory field For example, U.S. Pat. No. 4,168,541 (DeKarske) uses a set of three age bits per four blocks to identify a data block which should be replaced with a new block of data from a main memory; this technique is inappropriate for use in a TDC since it measures age as least recent usage of a data block rather than measuring age as cumulative timing counts. In U.S. Pat. No. 4,747,043 (Rodman), a flag bit is used to indicate whether a word stored in a cache memory is invalid because its corresponding word in the main memory has been changed; this technique is inappropriate for use in a TDC since it is concerned with keeping two memories synchronized, rather than disposing of stale data in one memory after a predetermined residence duration.

OBJECTS OF THE INVENTION

Therefore, it is an object of the present invention to provide an improved apparatus and method for detecting stale data in a data storage.

It is another object of this invention to provide an apparatus and method for detecting stale data based on the value of the data in such data storage.

It is a further object of the present invention to provide stale data detecting apparatus which can be fabricated as an integrated circuit of small size.

It is an additional object of the present invention to provide apparatus for detecting stale data which is capable of high speed operation.

It is yet another object of this invention to provide apparatus for detecting stale data after it has resided in a data storage for a predetermined duration.

It is still another object of the present invention to provide apparatus for detecting stale data which does not interfere with the data capture function of the data storage with which such apparatus is used.

Other objects, features and advantages of the present invention will become apparent from the following detailed description and the novel features will be particularly pointed out in the appended claims.

SUMMARY OF THE INVENTION

In accordance with this invention, apparatus for stale data detection includes a latching circuit responsive to the occurrence of an event for latching an (n+m) bit timing data count then being generated by a cyclical timing generator, and for storing that count as a time character with an associated validity flag. A stale data processor responds to a timing data count from the timing generator and at least one of the m bits of a stored time character for testing if that stored time character was produced during a previous cycle of the timing data counts and, if so, the validity flag associated with that stored time character is set, thereby identifying a stale stored time character.

In one embodiment, an nth bit and the m bits of the timing data count are combined to provide a periodic data disposal signal, and when this periodic data disposal signal and the most significant bit of the m bits of a stored time character have predetermined values, the stored time character is identified as stale.

In accordance with one aspect of this embodiment when a stored time character which has not been identified as stale is read out, a comparison is done between the read out time then generated by the timing generator and the time character to further identify stale data.

BRIEF DESCRIPTION OF THE DRAWINGS

The following detailed description, given by way of example and not intended to limit the present invention solely to the embodiment shown and described herein, will best be understood in conjunction with the following drawings in which:

FIG. 5 is a table used for explaining the stale data processor shown FIG. 2;

DETAILED DESCRIPTION OF THE INVENTION

Figure 1:
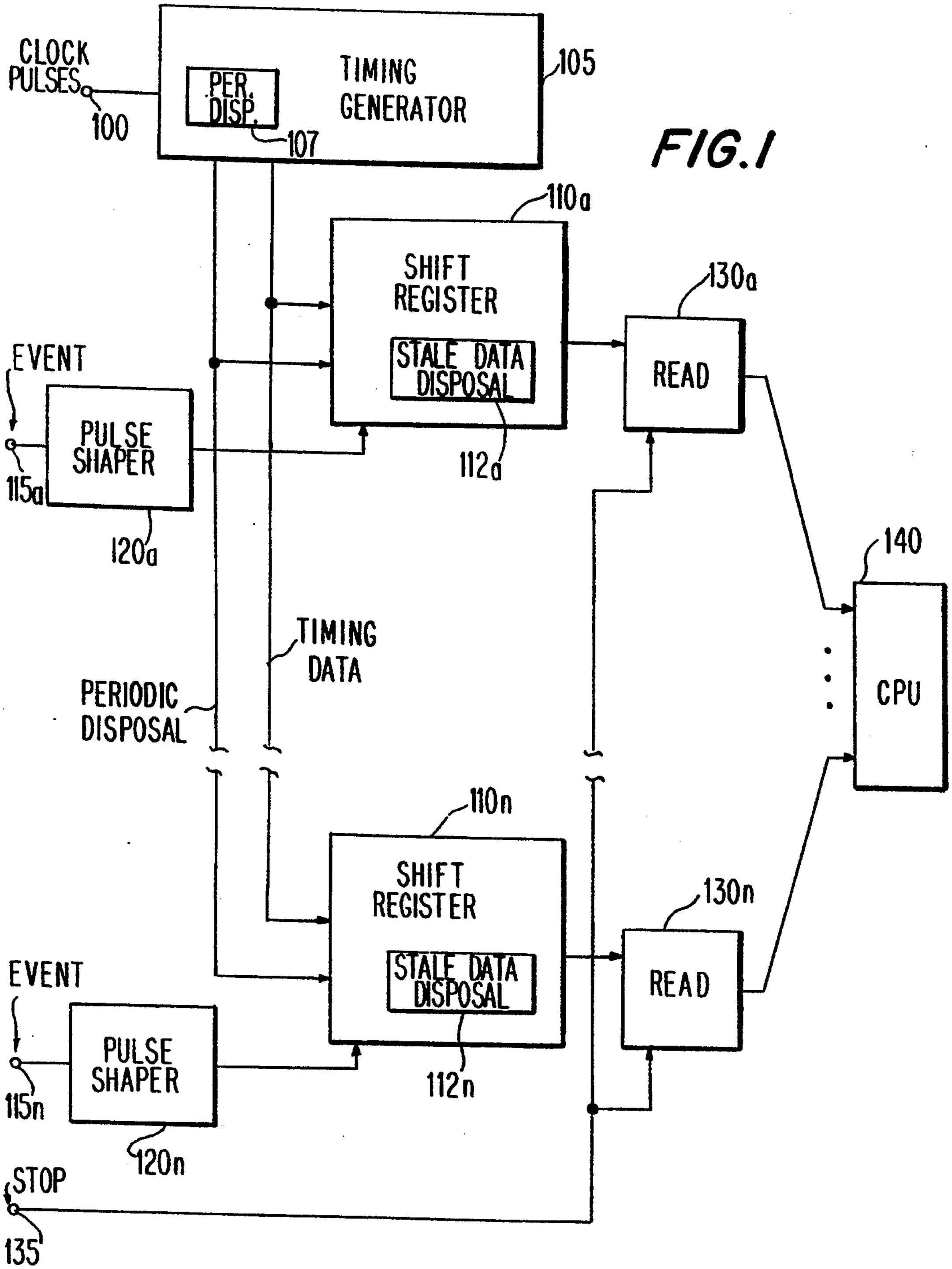
FIG. 1 is a block diagram showing a time-to-digital converter apparatus employing this invention.

Referring now to the drawings, and in particular to FIG. 1, there is illustrated a block diagram of a time-to-digital converter (TDC) employing a stale data processor according to the present invention. The apparatus illustrated in FIG. 1 is adapted to capture a time at which an event occurs, and to store this captured time for subsequent read-out and analysis. As will be further described, the age, that is, the residence duration in the TDC, of captured timing data is periodically tested, and when the captured data is found to be older than a predetermined threshold, it is flagged as stale and thereby effectively discarded. During read-out, the remaining data (i.e., that which has not been flagged as stale data) is tested against a more stringent age threshold so that, although it may be read-out, it is nevertheless flagged as stale if its age exceeds the second threshold. This two-stage stale data detection scheme ensures that data read-out as recent data can be relied on to be recent. Furthermore, an integrated circuit chip according to this technique can be efficiently fabricated to operate at a required high speed.

FIG. 1 is comprised of a clock pulse input terminal 100, a timing generator 105 including a periodic disposal signal generator 107, shift registers 110*a* . . . 110*n* respectively including state data disposal circuits 112*a* . . . 112*n*, event input terminals 115, read circuits 130, and a stop input terminal 135.

As illustrated, clock pulse input terminal 100 is adapted to supply high frequency clock pulses generated by a suitable source (not shown) at, for example, 1 GHz, to timing generator 105. Timing generator 105 is adapted to receive the clock pulses and to generate a cycle of timing data counts at, for example, a 0.5 nanosecond count rate. In the preferred embodiment of the present invention, the counts are in a gray code, but a binary code may alternatively be used. The timing data has a number of bits, for example, 18, which is greater than the number of bits needed for the externally available timing range and time data analysis of the TDC, for example, 16. That is, although the TDC makes available for read-out only event times captured within the most recent $2^{16}$ (65,536) counts, it can internally distinguish event times occuring within the most recent $2^{18}$ (262,144) counts. As discussed in detail below with reference to FIG. 2, timing generator 105 is also adapted to generate a periodic stale data disposal signal for testing the age of captured data. The timing data and periodic stale data disposal signal are supplied in common to shift registers 110.

Shift registers 110, comprising shift register 110*a* . . . shift register 110*n*, are adapted to latch, store and read-out the timing data generated by timing generator 105. Upon being latched, timing data is hereinafter referred to as a time character. In the present embodiment, the shift registers 110 each may store up to 16 time characters. As discussed in detail below, stale data disposal circuits 112*a* . . . 112*n* are respectively adapted to dispose of stale time characters stored in shift registers 110*a* . . . 110*n*, in response to the periodic stale data disposal signal provided by timing generator 105. Specifically, each of the stale data disposal circuits 112*a* . . . 112*n* includes a stale data disposal circuit for each of the 16 time characters stored in the respective shift registers 110*a* . . . 110*n*. In an alternative embodiment, storage means such as random access memory could be used instead of shift registers.

Event input terminals 115, comprising event input terminal 115*a* . . . event input terminal 115*n*, are adapted to supply high transient pulses, referred to as impulses, to pulse shapers 120, comprising pulse shaper 120*a* . . . pulse shaper 120*n*, respectively. Each impulse represents an event for which an occurrence time, that is, a time character, is to be captured. The event might be, for example, a sub-atomic particle being detected by a detector in a detection chamber (not shown).

Pulse shapers 120 are adapted to receive impulses supplied through respective event input terminals 115 and to shape the impulses into strobe signals. The strobe signals are supplied to shift registers 110; and upon receiving a strobe signal, a shift register latches and stores the current timing data then being generated by timing generator 105. That is, timing data is captured in shift registers 110 when the TDC receives impulses through event input terminals 115.

Stop input terminal 135 is adapted to supply a stop signal simultaneously to read circuits 130, comprising read circuit 130*a* . . . read circuit 130*n*. That is, the TDC shown in FIG. 1 is adapted to operate in common stop mode. Typically, the stop signal, which is supplied from, for example, a co-incidence detector (not shown) that need not be described for a proper understanding of the present invention, arrives at aperiodic times. Hence, successive stop signals may be separated by more than a full counting cycle of the timing generator 105.

Read circuits 130 are adapted to receive the stop signal supplied through stop input terminal 135, and to read-out data from shift registers 110, respectively, to a CPU 140 in response to the stop signal. Read circuits 130 are also adapted to test the age of the data being read-out, and to flag it as stale if it exceeds a threshold which is more stringent than the threshold used by the shift registers 110 to dispose of stale data, as will be described.

CPU 140 is adapted to process the timing data read-out from shift registers 110 by read circuits 130, and forms no part of the present invention per se.

Event input terminals 115, pulse shapers 120, shift registers 110 and read circuits 130 comprise respective channels of the TDC. Thus, channel a is comprised of event input terminal 115*a*, pulse shaper 120*a*, shift register 110*a* and read circuit 130*a*; and so on. In the preferred embodiment, the TDC includes 8 channels.

The manner in which the apparatus illustrated in FIG. 1 operates will now be described with reference to FIGS. 7A–7M which comprise timing diagrams that are used to explain the operation of the apparatus in FIG. 1. For simplicity, only the operation of the TDC channel a is described, although it is to be understood that each of the TDC channels functions simultaneously and independently in like manner, so that timing data for simultaneous events arriving through separate channels may be captured.

Figures 7A, 7B, 7C, 7D, 7E, 7F, 7G, 7H, 7I, 7J, 7K, 7L, 7M:
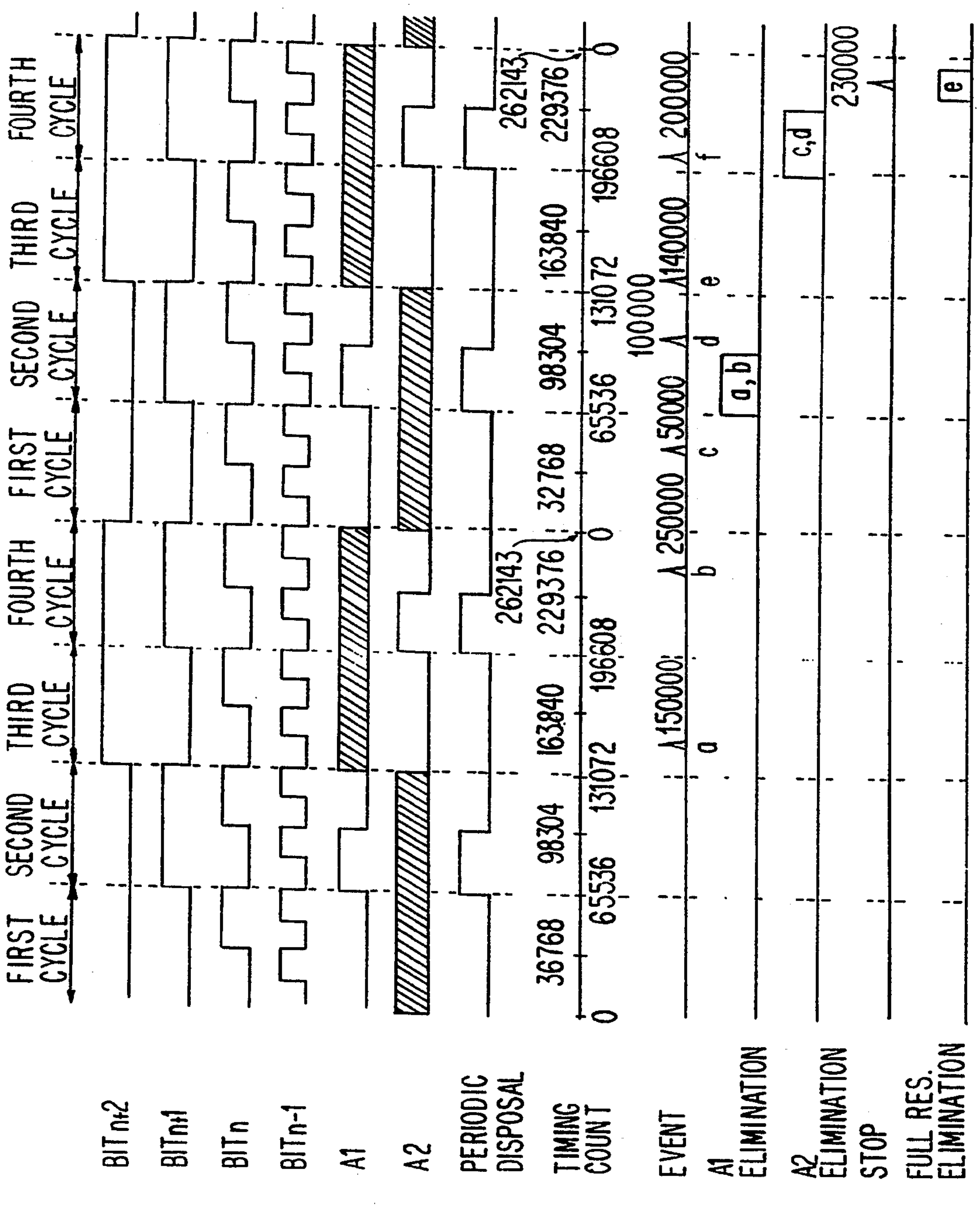
FIGS. 7A through 7M are timing diagrams useful in explaining the operation of the time-to-digital converter shown in FIG. 1.

Clock pulses are continually supplied through clock pulse input terminal 100 to timing generator 105; upon receiving the clock pulses, timing generator 105 repeatedly counts through its count cycle. FIGS. 7A through 7D show timing waveforms for the most significant bits, $n-1$ through $n+2$, of the timing count for eight successive counter cycles and FIG. 7H shows actual timing counts during these eight counter cycles. The timing generator counts through the externally available timing range once per cycle; the internally available timing range comprises four such cycles.

When an event impulse is supplied through event input terminal 115*a*, pulse shaper 120*a* converts it into a strobe signal. The strobe signal triggers shift register 110*a* to latch the current timing data count of timing generator 105 and store a time character comprised of that count. Thus, and as a numerical example, let it be assumed that the time character "150000", corresponding to event a shown in FIG. 7I, is stored in the shift register 110*a*.

The next event impulse will similarly result in storage in shift register 110*a* of a time character which, for the purpose of this discussion, is assumed to be "250000", corresponding to event b shown in FIG. 7I. When the most recent time character is stored, the previous time character is shifted to an available (e.g., an adjacent) stage, so that the contents of the shift register 110*a* now are assumed to be: (250000, 150000). Let it be assumed that another event impulse arrives after the count cycle rolls over, that is, after the count begins anew at zero, corresponding to event c shown in FIG. 7I, and is stored as a time character "50000", so that the contents of the shift register 110*a* are assumed to be: (50000,250000,150000).

As mentioned above, timing generator 105 generates a periodic stale data disposal signal, shown in FIG. 7G. As described in more detail in connection with FIG. 2, in the preferred embodiment, the periodic stale data disposal signal actually comprises two signals, A1 and A2, shown in FIGS. 7E and 7F, respectively. Each of signal A1 and A2 has a duration of one-half of the externally available timing range and occurs once per internally available timing range. That is, for the externally available timing range of $2^{16}$ timing counts and internally available timing range of $2^{18}$ timing counts of the preferred embodiment, signal A1 is "ON" during timing counts 65,536 through 98,303 and signal A2 is "ON" during timing counts 196,608 through 229,375. During the disposal operation enabled by each signal, time characters of age from one to three timing cycles are disposed of. The disposal operation is achieved using one bit of a stored time character in a comparison operation, thus facilitating a fast implementation with a small amount of circuitry, as will be described below. Consequently, in response to signal A2, time characters captured during counts 0 through 131,071 are disposed of, while in response to signal A1, time characters captured during counts 131,072 through 262,143 are disposed of, as shown by the shaded portions of FIGS. 7E and 7F.

Shift register 110*a* responds to the stale data disposal signal to dispose of stale stored time characters by setting a validity flag associated with each time character. It will be appreciated that a time character having a validity flag set to zero is not read out of a shift register. Specifically, in this example, after the capture of time characters corresponding to events a, b, and c, signal A1 of the periodic disposal signal is "ON" during timing counts 65,536 through 98,303, and in response to signal A1, shift register 110*a* determines that the time characters associated with events a and b are stale, and disposes of them, as shown in FIG. 7J. The contents of shift register 110*a* now are assumed to be: (50000).

Let it be further assumed that three additional events, events d, e, and f shown in FIG. 7I, occur over an interval of time, resulting in the storage of three additional time characters. Hence, the contents of shift register 110*a* may be assumed to be: (200000, 140000, 100000, 50000). In response to signal A2 of the periodic disposal signal being "ON" during timing counts 196,608 through 229,375, shift register 110*a* determines that the time characters associated with events c and d are stale, and disposes of them, as shown in FIG. 7K. The contents of shift register 110*a* now are assumed to be: (200000, 140000).

Let it be assumed that a stop signal is supplied through stop input terminal 135 to read circuit 130*a*, after the aforementioned stale data disposal operations and before the next event occurs, as shown in FIG. 7L. Read circuit 130*a* reads the time characters stored in shift register 110*a*, performs a full resolution comparison to determine if any time characters are older than one cycle, i.e., a comparison using all the bits of the time character, flags stale time characters, and reads-out recent time characters, that is, time characters captured within one cycle of receipt of the stop signal. In this example, let it be assumed that the stop signal is received at timing count 230,000. Time character 200,000 is found to be recent, since it was captured within the most recent $2^{16}$ (65,536) timing counts. However, time character 140,000 is more than $2^{16}$ timing counts older than the current timing count, 230,000, so it is determined to be stale, as shown in FIG. 7M. Read circuit 130*a* supplies the time character 200,000, corresponding to event f, to CPU 140 as a recent time character.

Thus, it can be seen that an advantage of the low resolution (one bit) comparison described above is to ensure that time characters are eliminated from the TDC by the stale data processor after they have resided in the shift registers for a minimum duration of one externally available timing count cycle, e.g., event b of FIG. 7I, and a maximum duration of three cycles, e.g., event a of FIG. 7I, that is, egregiously stale time characters are automatically disposed of while in the shift registers. Another advantage is that full resolution comparison is performed on a smaller number of time characters than in a TDC lacking a stale data processor, so that read-out occurs more rapidly.

Figure 2:
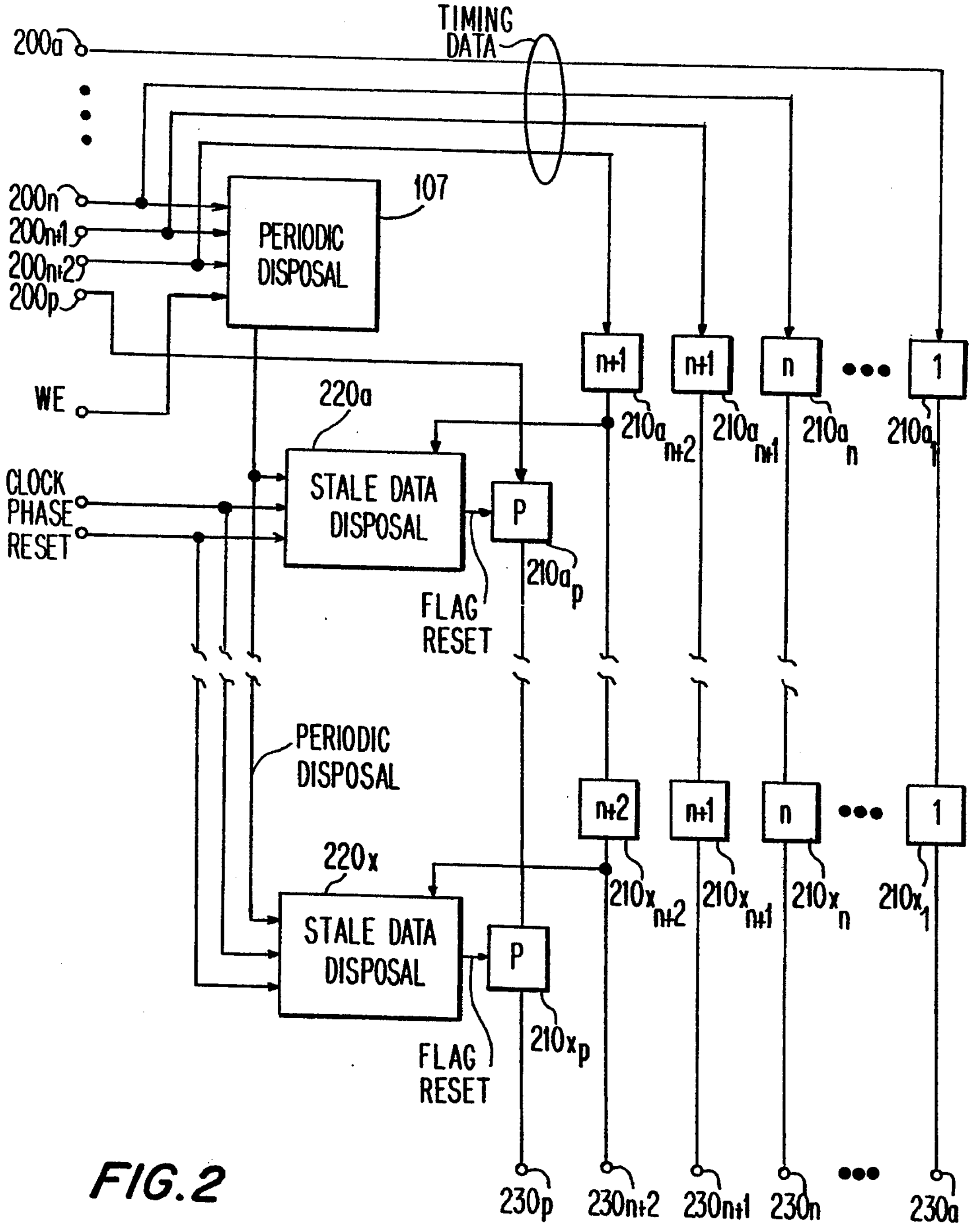
FIG. 2 is a block diagram showing a stale data processor according to the present invention.
Figure 3:
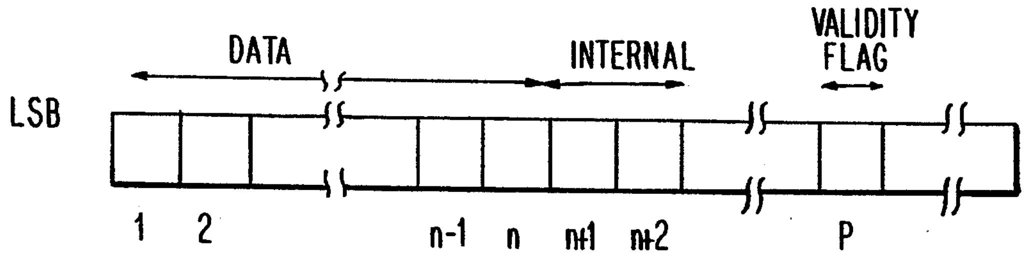
FIG. 3 is a schematic representation of data bits used in the time-to-digital converter shown in FIG. 1.

The operation of stale data disposal by the shift registers 110, using a low resolution (one bit) comparison, will now be described in detail with reference to FIGS. 2 and 3. FIG. 2 shows the portions of timing generator 105 and shift registers 110 which comprise a stale data processor. FIG. 3 shows the data format of a time character stored in shift registers 110.

As illustrated in FIG. 3, a time character comprises n bits for providing the externally available timing range of the TDC, an additional m bits for providing an internal timing range higher than the external timing range, one bit used for a validity flag, and additional bits unimportant to this invention. In the preferred embodiment, n=16 and m=2. That is, bits 1-16 provide the externally available timing range and the m additional bits n+1 through n+2, that is, bits 17-18, provide for an extended internal timing range. The validity flag bit is designated as the pth bit, resulting in a 21 bit time character.

FIG. 2 is comprised of timing data terminals 200, a periodic disposal signal generator 107, word registers 210, stale data disposal circuits 220 and time character output terminals 230.

Timing data terminals 200, comprising timing data terminal **200*a* . . . timing data terminal 200*n*+2, are adapted to supply the current timing data count generated by timing generator 105 to periodic disposal signal generator 107 and to shift registers 110. Timing data terminal 200*p* is adapted to supply, to periodic disposal signal generator 107 and to shift registers 110**, a validity flag signal, generated by an external source and indicating that valid incoming events are to be expected.

Periodic disposal signal generator 107 is adapted to receive the current timing data count and to generate the periodic stale data disposal signal for a predetermined duration during certain portions of the timing count cycles at periods indicated by the most significant bits of the current timing data count. As illustrated in FIG. 2, the bits used in the preferred embodiment are bit n through bit n+2. In the preferred embodiment, the periodic disposal signal generator is a logic circuit whose output is "ON" for certain input values; an example of such a logic circuit is provided in FIG. 4 and discussed below.

Character registers 210, comprising word register **210*a* . . . word register 210*x*, correspond to a shift register shown in FIG. 1, for example, shift register 110*a***. In the preferred embodiment, each shift register includes 16 character registers. Each character register, for example, register $\mathbf{210}a_p$ comprising bit latch $\mathbf{210}a_1$ . . . bit latch $\mathbf{210}a_p$, is operative to store one time character and its associated validity flag. The bit latches $\mathbf{210}a_p$ . . . $\mathbf{210}x_p$ associated with the validity flags are also adapted to be set to zero in response to a reset signal.

Stale data disposal circuits 220, comprising stale data disposal circuit **220*a* . . . stale data disposal circuit 220*x*, correspond to a stale data disposal circuit, for example, stale data disposal circuit 112*a*, shown in FIG. 1. Stale data disposal circuits 220 are adapted to receive both the periodic disposal signal generated by the periodic disposal signal generator 107 and a signal representing the value of a bit to be tested in their associated character registers. For example, stale data disposal circuit 220*a* receives the value of the n+2th bit of the character in word register 210*a* via a signal from bit latch $\mathbf{210}a_{n+2}$, stale data disposal circuit 220*x* receives the value of the n+2th bit of the character in word register 210*x*** via a signal from bit latch $\mathbf{210}x_{n+2}$, and so on.

Figure 6:
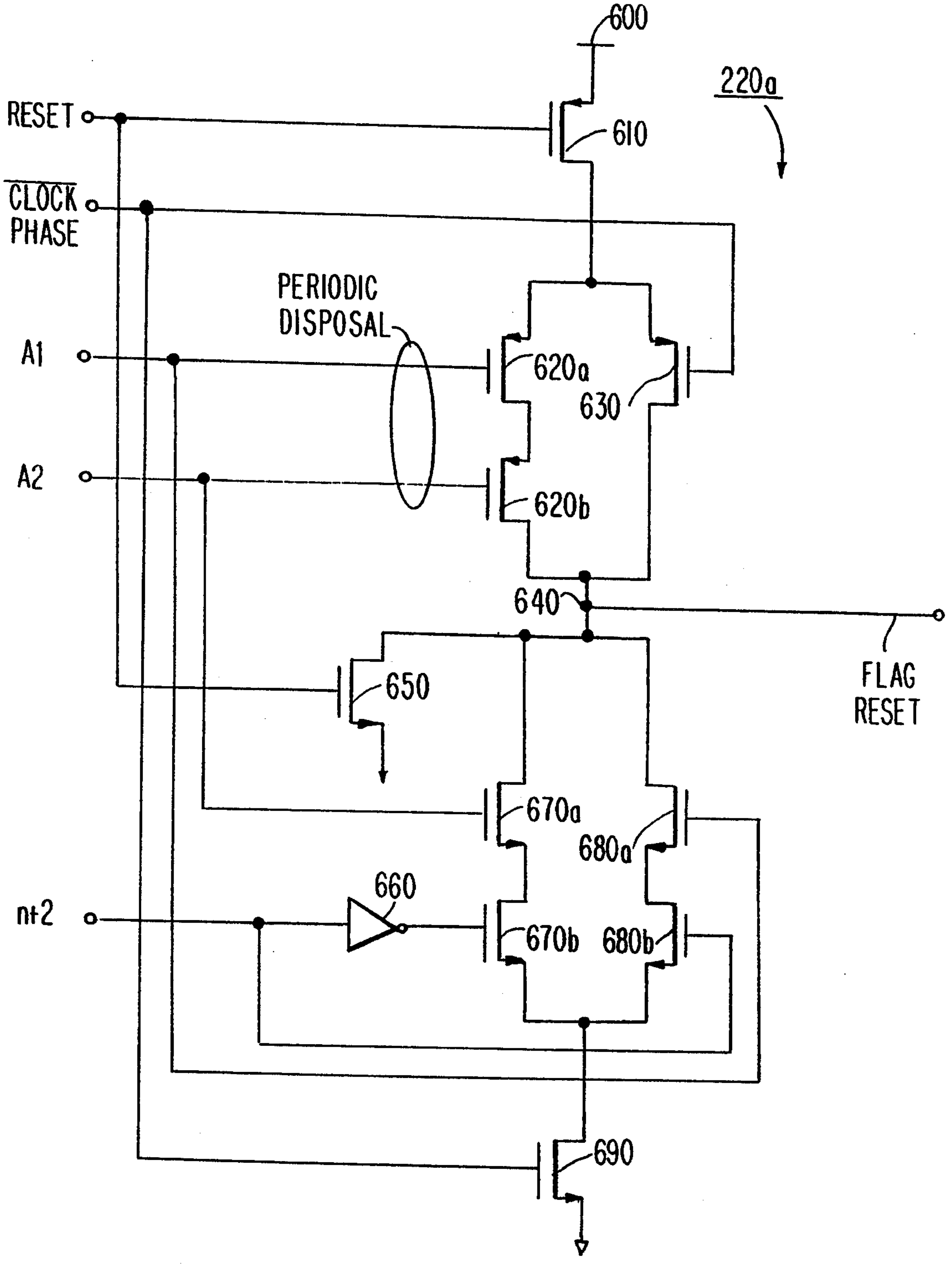
FIG. 6 is a schematic diagram of one of the stale data disposal circuits shown in FIG. 2.

Each stale data disposal circuit is further adapted to test its received bit in response to the periodic disposal signal, and to supply a flag reset signal to the bit latch containing the validity flag (e.g., the pth bit latch) in its associated character register if the test operation indicates that the associated time character is stale. For example, the stale data disposal circuit **220*a* supplies a flag reset signal to the bit latch $\mathbf{210}a_p$. In the preferred embodiment, a stale data disposal circuit is a logic circuit whose output is "ON" to set the validity flag to zero, when the bit being tested is determined to be stale. An example of such a logic circuit is illustrated in FIG. 6** and discussed below.

Time character output terminals 230, comprising time character output terminal **230*a* . . . time character output terminal 230*p*, are adapted to provide a time character and its associated validity flag from a shift register to a read circuit. For example, the time character in character register 210*x*, which comprises the output character for shift register 110*a*, is supplied to read circuit 130*a* through time character output terminals 230. Flag reading means (not shown) reads the validity flag of a character shifted to output terminals 230 and does not supply that character to read circuit 130*a*** if its validity flag is zero, that is, if it is marked as stale.

The manner in which the apparatus illustrated in FIG. 2 operates will now be described.

Timing generator 105 repeatedly counts through its count cycle and supplies the timing data counts to timing data terminals 200. As described in the discussion of FIG. 1, impulses aperiodically result in the current timing data being latched in a shift register, specifically, in the first character register, that is, character register **210*a*. When timing data is latched into character register 210*a*, the time character previously stored in register 210*a* is shifted to the next stage register, i.e., towards character register 210*x*. The time characters having non-zero validity flags in registers 210 are read out through time character output terminals 230 by read circuit 130*a*** in response to a stop signal.

In response to the timing data counts supplied from timing data generator 105, periodic disposal signal generator 107 supplies the periodic stale data disposal signal in an "ON" condition during selected portions of count cycles. When the periodic stale data disposal signal is "ON", stale data disposal circuits 220 are enabled thereby to use the n+2th bit in their associated character registers to test whether the respective stored time characters are stale, that is, whether a stored time character has a timing count of value earlier than a predetermined threshold, as determined by the n+2th bit. The periodic stale data disposal signal is maintained in an "ON" condition for a duration sufficient for this testing to occur. Since the TDC operates at an extremely high speed, a stale data testing operation and subsequent disposal operation spans many timing counts.

An advantage of testing only a small number of bits, herein, one, of each stored time character is to thereby permit the testing circuitry to be of simple construction, which in turn allows the size of a memory chip, having shift registers that perform stale data disposal, to be small.

When a stale data disposal circuit 220 determines that its associated time character is stale, it sets its flag reset signal in an "ON" condition. In response to a respective flag reset signal, a bit latch 210$a_p$ . . . 210$x_p$ sets its contents, that is, the validity flag, to zero. Consequently, the associated time character is effectively disposed of, since it will not be read-out due to the zero value of its validity flag.

Figure 4:
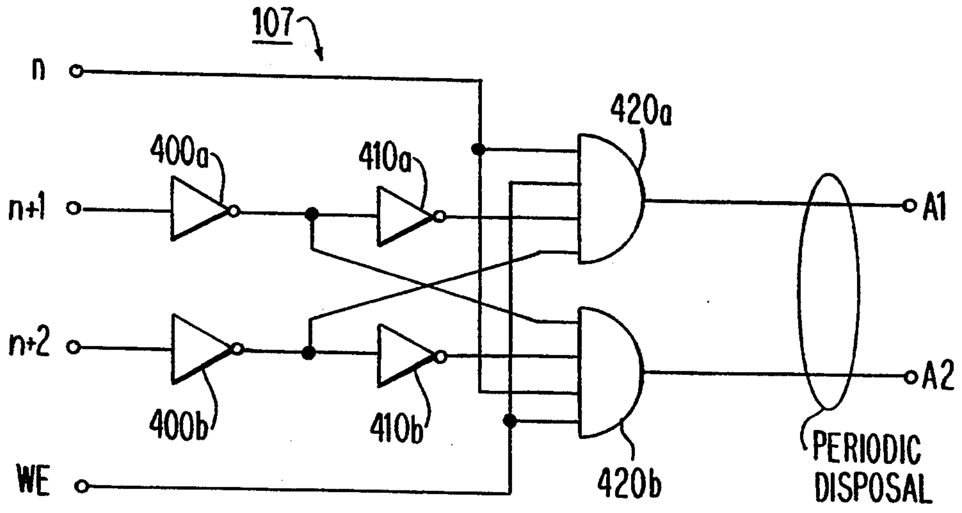
FIG. 4 is a schematic diagram of the periodic disposal circuit shown in FIG. 1.

A preferred embodiment of the periodic disposal signal generator 107 will now be illustrated with reference to FIGS. 4 and 5. FIG. 4 is a schematic representation of the periodic disposal signal generator. FIG. 5 is a table representing the operation of the circuit shown in FIG. 4.

FIG. 4 is comprised of inverters 400 and 410, and AND gates 420. Inverters 400, comprising inverter 400*a* and inverter 400*b*, are adapted to receive and invert the most significant bits of a timing data count, herein, bit n+2 and bit n+1. It will be appreciated that inversion consists of changing a "0" value to a "1" value and vice-versa.

Inverters 410, comprising inverter 410*a* and inverter 410*b*, are adapted to receive the outputs from inverters 400*a* and 400*b*, respectively, and to further invert the inverted bits. Consequently, the outputs of inverters 410 and 400 are the true and complements of the two most significant timing data count bits (MSBs).

AND gates 420, comprising AND gate 420*a* and AND gate 420*b*, are adapted to receive the true and complement MSBs, the nth timing data count bit and a write enable (WE) signal, and to supply an output which is true ("1") when all of the respective inputs are true ("1"). The WE signal is supplied from an external source, such as a controller, to the TDC. The AND gates 420*a* and 420*b* produce respective output signals A1 and A2, which comprise the periodic data disposal signal.

The manner in which the circuit illustrated in FIG. 4 operates will now be described. In the following example, let it be assumed that the write enable signal is always true ("1").

FIG. 5 illustrates four count cycles, in gray code, of the most significant bits of the timing data counts. If the bits n through n+2 of the current timing count are all false ("0"), the output A1, corresponding to a logical AND of bit n, bit n+1 and NOT(bit n+2), and the output A2, corresponding to a logical AND of bit n, NOT(bit n+1) and bit n+2, are false ("0").

Similarly, the outputs A1 and A2 are false ("0") for other values of the most significant bits of the timing data counts, except A1 is true only when bit n is true, bit n+1 is true and bit n+2 is false, i.e., have respective values 1, 1, and 0, whereas A2 is true only when bit n is true, bit n+1 is false and bit n+2 is true, i.e., have respective values 1, 0 and 1. That is, each of A1 and A2 are true for half of an n-bit cycle, every four cycles, so that the periodic disposal signal comprising A1 and A2 is true for half of an n-bit cycle, every other cycle. In the example described herein, n=16.

A preferred embodiment of the stale data disposal circuit 220*a* will now be illustrated with reference to FIGS. 5 and 6. FIG. 6 is a schematic representation of the stale data disposal circuit 220*a*. The table in FIG. 5 also represents the operation of the circuit shown in FIG. 6.

FIG. 6 is comprised of reset transistors 610 and 650, isolation transistors 620*a* and 620*b*, inhibit transistors 630 and 690, flag setting transistors 670*a*, 670*b*, 680*a* and 680*b* and inverter 660.

Reset transistors 610 and 650 are adapted to receive an externally generated RESET signal for resetting the stale data disposal circuit on power-up or between capturing time characters. When the RESET signal is true ("1") transistor 610, which preferably is a p-channel MOS transistor, is cut off, preventing the flow of current from a power supply 600, and transistor 650, which is shown as an n-channel MOS transistor is turned on to supply a low level signal ("0") at node 640, so the output of the stale data disposal circuit, a flag reset signal, goes to false ("0") for resetting bit latch 210$a_p$, effectively disposing of the time character in register 210*a*. When the reset phase is over, the RESET signal returns to false ("0"), transistor 650 is cut off and transistor 610 is enabled, permitting the flag reset signal supplied from node 640 to change with predetermined input values.

Inhibit transistors 630 and 690 are adapted to receive an externally generated inverted clock phase signal (NOT CP) which assumes a value of false ("0") to define an interval during which a shift operation is carried out to capture a new time character and to shift older time characters to the next shift register stage. During a shift operation, the NOT CP signal at value "0" turns transistor 630 on so that node 640 is true ("1"), thus the flag reset signal of the stale data disposal circuit is inhibited and data disposal cannot occur. When a shift operation is not occurring, the NOT CP signal has a true value ("1"), so that transistor 690 is on, permitting the output of the circuit to change with predetermined input values. That is, inhibit transistors 630 and 690 prevent accidental data disposal during capture of a new time character.

Isolation transistors 620*a* and 620*b* are adapted to receive the periodic disposal signal, that is, the signals A1 and A2, respectively, supplied from the periodic disposal signal generator 107, and to force the flag reset signal supplied from node 640 of the stale data disposal circuit to be true ("1") when both signals A1 and A2 are false. Transistors 620*a* and 620*b* thus isolate the flag reset signal from triggering accidental data disposal due to voltage levels of the circuit possibly decaying to an improper state, which may occur since the voltage levels are assumed to be restored or reset aperiodically.

Inverter 660 is adapted to receive the n+2th bit from bit latch 210$a_{n+2}$ and to supply an inverted output to flag setting transistor 670*b*. Flag setting transistor 670*a* is adapted to receive the A2 signal, and when A2 is true ("1") and the n+2th bit of the current time character is false ("0"), the transistors 670*a* and 670*b* are adapted to conduct so as to bring node 640 to a low level ("0"), thereby causing the flag reset signal to have a value of "0", thus indicating that the time character in word register 210*a* is stale, and setting its validity flag to zero.

Flag setting transistors 680*a* and 680*b* are adapted to receive the A1 signal and the n+2th bit from bit latch 210$a_{n+2}$, respectively. When A1 is true ("1") and the n+2th bit of the current time character is true ("1"), both transistors conduct so as to bring node 640 to a low level ("0"), thereby causing the flag reset signal to have a value of "0", thus indicating that the time character in word register 210*a* is stale, and setting its validity flag to zero.

The manner in which the apparatus illustrated in FIG. 6 operates will now be described. In the following example, let it be assumed that the RESET signal is always false ("0") and the inverted clock phase signal is always true ("1"), that is, no shift operation is occurring.

FIG. 5 illustrates values assumed by the n+2th bit of the time character stored in register 210*a* during four count cycles and the values of the consequent flag reset signal produced by the stale data disposal circuit 220*a*. A dashed line indicates that the value is irrelevant, that is, the flag reset signal is not affected by the value.

When the periodic disposal signal is false, that is, when both A1 and A2 supplied from the periodic disposal signal generator 107 are false ("0" and "0"), the flag reset signal supplied from node 640 of the stale data disposal circuit 220*a* is true ("1"). When A1 is true ("1"), transistor 680*a* is on, and when the n+2th bit of the time character stored in register 210*a* is true ("1"), transistor 680*b* is on, so that the flag reset signal is false ("0"), indicating that the time character is stale and its validity flag should be set to zero.

Similarly when A2 is true, transistor 670*a* is on, when the n+2th bit of the stored time character is false, the output of inverter 660 is true so transistor 670*b* is on, node 640 is at a low level, supplying a false ("0") flag reset signal to set the validity flag of the time character to zero.

As shown in FIG. 5, the n+2th bit of a time character captured during the first cycle is equal to zero, and so it is bypassed by the stale data disposal operation in the second cycle, that is, the time character is not accidentally erased because it constitutes recent data. However, during the next stale data disposal operation, occurring during the fourth cycle, this stored time character is recognized as stale and is effectively disposed of. Should read-out occur between the second and fourth cycle, the full resolution comparison operation recognizes the time character as stale and flags it appropriately.

It is seen that the n+2th bit of a time character captured during the second cycle also is equal to zero, and likewise is not disposed of as stale until the fourth cycle. During read-out of the time character during a latter portion of, for example, the third cycle, a full resolution comparison recognizes this time character as stale.

The n+2th bit of a time character captured during the third or fourth cycle is equal to one, and is not eliminated until a timing counter roll-over occurs, that is, the timing counter reaches its maximum value and starts counting anew from zero, and a stale data disposal operation occurs during a second cycle of the rolled-over counter.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

For example, although the preferred embodiment of the present invention is used with a TDC operating in common stop mode, the present invention could also be used with a TDC operating in common start mode.

What is claimed is:

1. Apparatus for data acquisition, comprising:

input means for supplying input signals representing occurrences of events;

timing data generating means for generating cyclical timing data counts comprised of (n+m) bits, wherein n and m are integers;

latching means responsive to each occurrence of an input signal for latching the timing data count when the input signal occurs and for storing said timing data count as a time character with an associated validity flag;

stale data processing means responsive to a timing data count and at least one of the m bits of a stored time character for testing if said stored time character was produced during a previous cycle of said timing data counts;

flag setting means for setting the validity flag associated with each stored time character produced during a previous cycle of said timing data counts, thereby identifying a stale stored time character; and reading means for reading out those stored time characters from said storing means which are not identified as stale stored time characters and including means for establishing a read out time, and comparison means responsive to a timing data count and to a stored time character then being read out at a read out time for setting the validity flag associated with said read out time character if said read out time character was captured during a timing data count cycle previous to the timing data count cycle at said read out time to thereby identify a stale read out time character.

2. Apparatus for data acquisition, comprising:

input means for supplying input signals representing occurrences of events;

timing data generating means for generating cyclical timing data counts comprised of (n+m) bits, wherein n and m are integers, including periodic disposal signal generating means responsive to a cyclical timing data count for generating a periodic disposal signal;

latching means responsive to each occurrence of an input signal for latching the timing data count when the input Signal occurs and for storing said timing data count as a time character with an associated validity flag;

stale data processing means including testing means responsive to said periodic disposal signal and at least one of the m bits of a stored time character for testing if said stored time character was produced during a previous cycle of said timing data counts; and flag setting means for setting the validity flag associated with each stored time character produced during a previous cycle of said timing data counts, thereby identifying a stale stored time character.

3. Apparatus according to claim 2, further comprising means for inhibiting said testing means during latching of a timing data count.

4. Apparatus according to claim 2, wherein said periodic disposal signal generating means comprises first periodic signal generating means for generating a first periodic signal indicating a first plurality of timing data count cycles of n bits in a timing data count cycle of n+m bits; and second periodic signal generating means for generating a second periodic signal indicating a second plurality of timing data count cycles of n bits in said timing data count cycle of n+m bits.

5. Apparatus according to claim 4, wherein each of said first and second periodic signal generating means is responsive to the nth bit and to the m bits of a timing data count, for generating said first and second periodic signals.

6. Apparatus according to claim 4, wherein said testing means comprises first flag signal generating means responsive to said first periodic signal and at least one of the m bits of a stored time character for generating a flag setting signal when at least one of the m bits exhibits a first value, thereby indicating that said stored time character was produced during one of the previous timing data count cycles of n bits; second flag signal generating means responsive to said second periodic signal and at least one of the m bits of a stored time character for generating said flag setting signal when at least one of the m bits exhibits a second value, thereby indicating that said stored time character was produced during another of the previous timing data count cycles of n bits; and wherein said flag setting means is responsive to said flag setting signal to set the validity flag of said stored time character.

7. Apparatus according to claim 6, wherein said first flag signal generating means includes first gating means to determine that said stored time character was produced during one of a first plurality of previous timing data count cycles of n bits when a most significant bit of said m bits of said stored time character has said first value during said first periodic signal; and said second flag signal generating means includes second gating means to determine that said stored time character was produced during one of a second plurality of previous timing data count cycles of n bits when said most significant bit of said m bits of said stored time character has said second value during said second-periodic signal.

8. Apparatus according to claim 7, wherein said first and second gating means each comprise a pair of transistor means.

9. Apparatus for data acquisition, comprising:

a plurality of input means, each for supplying input signals representing occurrences of events;

common timing data generating means for generating cyclical timing data counts comprised of (n+m) bits, wherein n and m are integers;

a plurality of latching means, each coupled to a respective input means and to said common timing data generating means for latching the timing data count upon the occurrence of an input signal and for storing said timing data count as a time character with an associated validity flag;

a plurality of stale data processing means, each coupled to said common timing data generating means and a respective latching means, responsive to a timing data count and to at least one of the m bits of each of the time characters stored in said respective latching means for testing if the stored time characters were produced during a previous cycle of said timing data counts;

a plurality of flag setting means, each for setting the validity flag associated with a stored time character produced during a previous cycle of said timing data counts, thereby identifying a stale stored time character; and a plurality of reading means, each coupled to a respective storage means for reading out those stored time characters from said respective storage means which are not identified as stale stored time characters, and each including means for establishing a common read out time, and comparison means responsive to a timing data count and to a stored time character then being read out at a read out time for setting the validity flag associated with said read out time character if said read out time character was captured during a timing data count cycle previous to the timing data count cycle at said read out time to thereby identify a stale read out time character.

10. Apparatus for data acquisition, comprising:

a plurality of input means, each for supplying input signals representing occurrences of events;

common timing data generating means for generating cyclical timing data counts comprised of (n+m) bits, wherein n and m are integers, including periodic disposal signal generating means responsive to a cyclical timing data count for generating a periodic disposal signal;

a plurality of latching means, each coupled to a respective input means and to said common timing data generating means for latching the timing data count upon the occurrence of an input signal and for storing said timing data count as a time character with an associated validity flag;

a plurality of stale data processing means, each coupled to said common timing data generating means and a respective latching means, and each including a plurality of testing means, each responsive to said periodic disposal signal and at least one of the m bits of each of the time characters stored in said respective latching means for testing if the stored time character was produced during a previous cycle of said timing data counts; and a plurality of flag setting means, each for setting the validity flag associated with a stored time character produced during a previous cycle of said timing data counts, thereby identifying a stale stored time character.

11. Apparatus according to claim 10, wherein each of said testing means includes inhibit means for inhibiting a respective testing means during latching of a timing data count.

12. Apparatus according to claim 10, wherein said periodic disposal signal generating means comprises first periodic signal generating means for generating a first periodic signal indicating a first plurality of timing data count cycles of n bits in a timing data count cycle of n+m bits, and second periodic signal generating means for generating a second periodic signal indicating a second plurality of timing data count cycles of n bits in said timing data count cycle of n+m bits.

13. Apparatus according to claim 12, wherein each of said first and second periodic signal generating means is responsive to the nth bit and to the m bits of a timing data count, for generating said first and second periodic signals.

14. Apparatus according to claim 12, wherein said testing means comprises first flag signal generating means responsive to said first periodic signal and at least one of the m bits of a stored time character for generating a flag setting signal when at least one of the m bits exhibits a first value, thereby indicating that said stored time character was produced during one of the previous timing data count cycles of n bits; second flag signal generating means responsive to said second periodic signal and at least one of the m bits of a stored time character for generating said flag setting signal when at least one of the m bits exhibits a second value, thereby indicating that said stored time character was produced during another of the previous timing data count cycles of n bits; and wherein said flag setting means is responsive to said flag setting signal to set the validity flag of said stored time character.

15. Apparatus according to claim 14, wherein said first flag signal generating means includes first gating means to determine that said stored time character was produced during one of a first plurality of previous timing data count cycles of n bits when a most significant bit of said m bits of said stored time character has said first value during said first periodic signal; and said second flag generating means includes second generating to determine that said stored time character was produced during one of a second plurality of previous timing data count of n bits when said most significant bit of said m bits of said stored time character has said second value during said second periodic signal.

16. Apparatus according to claim 15, wherein said first and second gating means each comprise a pair of transistor means.

17. A method of determining when stored time characters, which represent respective times of event occurrences, are stale, said time characters being formed of (n+m) bits of a timing data count generated by a cyclic timing data counter, said method comprising the steps of:

sensing selected bits of a timing data count and at least one of the m bits of each of the stored time characters and generating first and second periodic disposal signals in response to said selected bits of said timing data count to define comparison periods; and setting a flag associated with each stored time character if the sensed bits of said timing data count and said stored time character have one of predetermined combinations of values, thereby indicating that said stored time character is a stale stored time character formed during a timing data count cycle prior to the timing data count cycle then generating said timing data count.

18. A method according to claim 17, wherein the step of generating first and second periodic disposal signals includes combining the nth bit and the m bits of said timing data count.

19. A method according to claim 17 wherein the step of setting a flag includes testing whether a most significant bit of said m bits of said stored time character has a first value during said first periodic disposal signal, and testing whether said most significant bit of said m bits of said stored time character has a second value during said second periodic disposal signal.

20. A method according to claim 17, wherein the step of sensing further includes detecting the condition of at least one of the m bits of each of the stored time characters during said comparison periods.

21. A method according to claim 20, wherein the step of detecting includes testing the value of a most significant bit of said m bits of said stored time character.

* * * * *

UNITED STATES PATENT AND TRADEMARK OFFICE

CERTIFICATE OF CORRECTION

PATENT NO. : 5,384,713

DATED : January 24, 1995

INVENTOR(S) : Kleinfelder

It is certified that error appears in the above-identified patent and that said Letters Patent is hereby corrected as shown below:

On the cover page, insert the following: item [73]

-- Assignee: Lecroy Corporation
Chestnut Ridge, New York --

Signed and Sealed this

Sixth Day of August, 1996

Attest:

BRUCE LEHMAN

Attesting Officer

Commissioner of Patents and Trademarks